United States Patent [19]

Morey

[11] Patent Number: 4,951,906

[45] Date of Patent: Aug. 28, 1990

[54] SIGN ATTACHMENT

[76] Inventor: Norman E. Morey, 5010 Jones, North Branch, Mich. 48461

[21] Appl. No.: 142,433

[22] Filed: Jan. 11, 1988

[51] Int. Cl.$^5$ ....................... F16M 11/00; G09F 15/00

[52] U.S. Cl. ................................. 248/201; 248/222.3; 248/316.8; 40/611; 40/607

[58] Field of Search .................. 248/201, 222.2, 222.3, 248/231.8, 316.8, 309.1, 72, 74.2, 359 F, 228, 488, 490; 40/610, 611, 609, 607, 606, 124.1, 360, 158 A

[56] References Cited

U.S. PATENT DOCUMENTS

| | | | |
|---|---|---|---|
| 751,832 | 2/1904 | Cahn et al. | 40/606 |
| 833,742 | 4/1908 | Rice | 248/222.2 |
| 2,125,747 | 8/1938 | Zadek | 40/156 X |
| 2,572,174 | 10/1951 | McKenzie | 40/609 X |
| 2,752,709 | 7/1956 | Gough | 248/231.8 X |
| 3,001,748 | 9/1961 | Austin | 248/201 X |
| 3,007,269 | 11/1961 | Jump | 40/610 |
| 3,542,365 | 11/1970 | Gantz | 40/152.1 X |
| 3,719,000 | 3/1973 | Finger | 40/609 |
| 4,103,445 | 8/1978 | Smith et al. | 40/607 X |
| 4,473,963 | 10/1984 | Hardy et al. | 40/124.1 X |
| 4,497,125 | 2/1985 | Hutchinson | 248/488 X |

FOREIGN PATENT DOCUMENTS

| | | | |
|---|---|---|---|
| 826367 | 11/1969 | Canada | 40/124.1 |

*Primary Examiner*—Karen J. Chotkowski
*Attorney, Agent, or Firm*—Gifford, Groh, Sprinkle, Patmore and Anderson

[57] ABSTRACT

An attachment for a sign of the type having two spaced apart rails and a generally planar indicia bearing member extending between the rails. The attachment includes a pair of elongated brackets, each having a first and second longitudinally adjacent section. The first section of each bracket is detachably secured to the rails on the top and on opposite sides of the sign so that the second sections of the bracket extend upwardly from the sign and are spaced apart and generally parallel to each other. These second bracket sections have facing slots which slidably receive and support a placard therebetween.

6 Claims, 2 Drawing Sheets

SIGN ATTACHMENT

BACKGROUND OF THE INVENTION

I. Field of the Invention

The present invention relates to an attachment to a sign for attaching a placard to the sign.

II. Description of the Prior Art

Many types of signs, such as real estate signs, comprise a pair of spaced apart rails which support a generally planar indicia bearing member therebetween. In the case of real estate signs, this indicia bearing member typically displays the name, telephone number and address of the real estate company representing the seller or lessor of the property in question This information, of course, remains the same regardless of the property so that the signs can be economically produced in mass quantities.

There are many situations, however, when it would be highly desirable to add additional information to the sign which is unique for the particular property being sold or leased. For example, such information could comprise the name of the particular real estate person handling that particular property. This information would typically be different from one property to the next.

Although there have been a number of previously known devices for attaching supplemental signs or placards to the standard real estate sign, these previously known devices have proven generally unsatisfactory in use.

One disadvantage of these previously known devices is that the supplemental placard is not firmly secured to the real estate sign. As such, high winds and gusts can blow the placard away from the sign.

A still further disadvantage of the previously known devices is that it is difficult and time consuming to actually attach the placard to the sign. Furthermore, in many cases, these previously known devices have been expensive to purchase.

SUMMARY OF THE PRESENT INVENTION

The present invention provides an attachment for a sign which overcomes all of the above mentioned disadvantages of the previously known devices.

In brief, the attachment of the present invention comprises a pair of elongated brackets, each having a first and second longitudinally adjacent section. The first section of one bracket is secured to the top and along one side of the sign while the second bracket is secured to the top and along the opposite side of the sign. In doing so, the second sections of the brackets extend upwardly from the sign and are spaced apart and generally parallel to each other.

These second sections, furthermore, include facing slots which extend longitudinally along the bracket and thus generally vertically when the brackets are attached to the sign. These slots, furthermore, are dimensioned to slidably receive and support a placard therebetween so that the placard is positioned above and generally coplanar with the sign.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
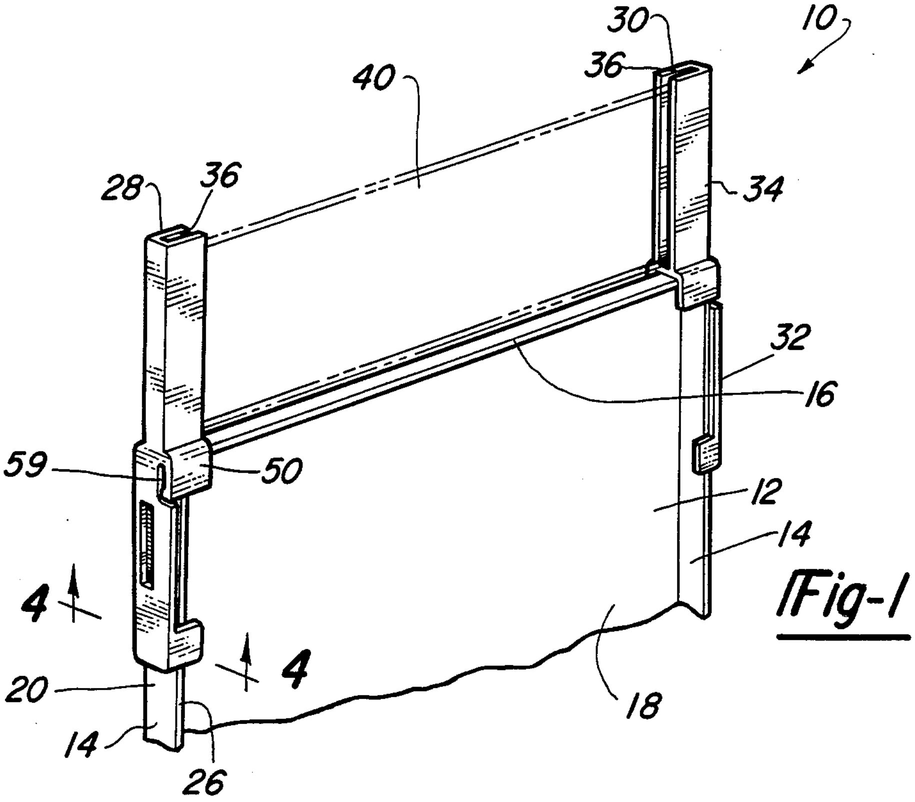
FIG. 1 is a fragmentary rear perspective view illustrating a preferred embodiment of the present invention.
Figure 2:
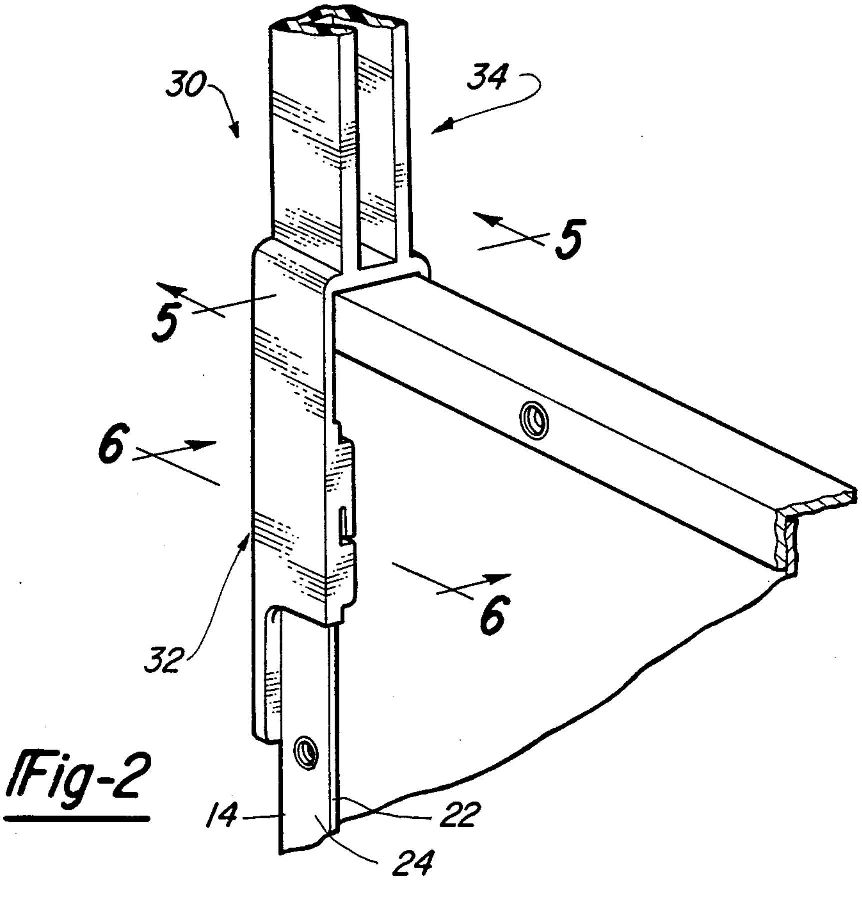
FIG. 2 is a front fragmentary perspective view illustrating a portion of the preferred embodiment of the present invention.

With reference first to FIGS. 1 and 2, a preferred embodiment of the sign attachment 10 of the present invention is thereshown for use with a conventional sign 12 of the type used by real estate companies. This sign 12 thus includes a pair of side rails 14 which are spaced apart and parallel to each other and a top rail 16 extending between the side rails 14. A generally planar indicia bearing member 18 is positioned between and secured to the rails 14 and 16.

Still referring to FIGS. 1 and 2, the rails 14 are generally L-shaped in cross-section thus having two legs which intersect each other at generally a right angle. Furthermore, the rails 14 have an outside surface 20 (FIG. 1) and an inside surface 22 (FIG. 2) which is spaced apart and generally parallel to the surface 20. Similarly, each rail 14 has a front surface 24 (FIG. 2) and a rear or back surface 26 (FIG. 1) which are spaced apart and parallel to each other.

Figure 3:
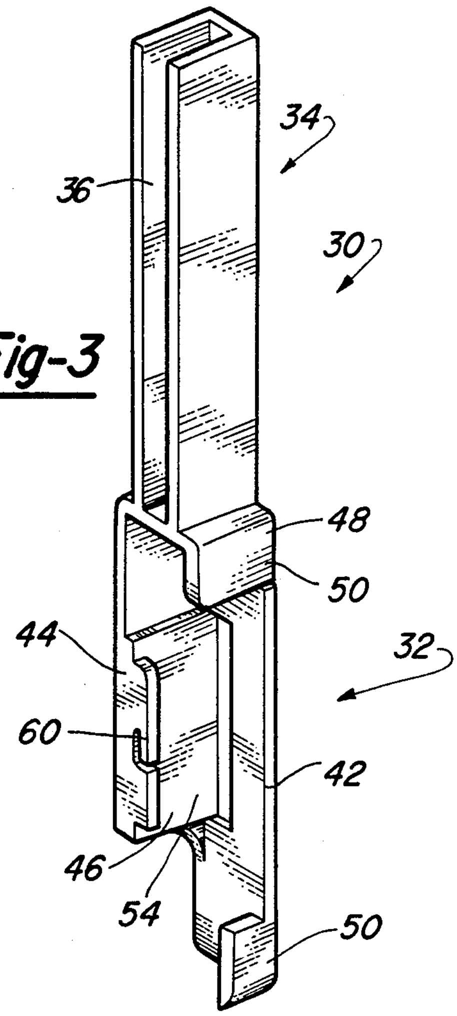
FIG. 3 is a perspective view illustrating one bracket of the preferred embodiment of the present invention.

With reference now to FIGS. 1–3, the attachment 10 of the present invention comprises a pair of brackets 28 and 30. The bracket 28 is a mirror image of the bracket 30 so that only the bracket 30 will be described in great detail, it being understood that a similar description shall also apply to the bracket 28.

The bracket 30 is generally elongated and comprises a lower first section 32 and an upper second section 34. As best shown in FIG. 1, the lower sections 32 of the brackets 28 and 30 are detachably secured to the top of the side rails 14 so that the second sections 34 protrude upwardly from the top rail 16 of the sign 12 and are spaced apart and generally parallel to each other. The second sections 34, furthermore, each include an elongated vertically extending slot 36 and the slot 36 on the brackets 28 and 30 face each other when they are attached to the sign 12. These slots 36 slidably receive a placard 40 (FIG. 1) and attach the placard 40 to the sign 12. This placard 40 can include any suitable indicia (not shown).

With reference now particularly to FIGS. 3–6, the first or lower bracket section 32 comprises an outside wall 42 and an inside wall 44 which is spaced apart and parallel from the outside wall 42. Similarly, the bracket section 32 includes a front wall 46 and a rear or back wall 48. The back wall 48 is divided into two coplanar but longitudinally spaced parts 50 for a reason to be subsequently described. Furthermore, as best shown in FIG. 3, the inside wall 44 is positioned in between the back wall parts 50 for a reason to be subsequently described.

Figure 7:
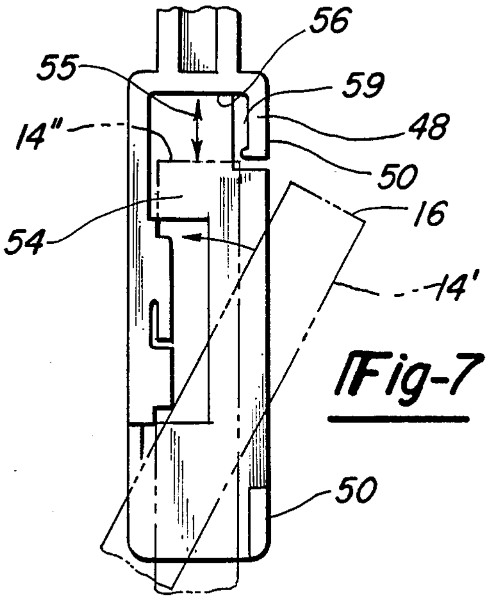
FIG. 7 is a diagrammatic side view illustrating the operation of the preferred embodiment of the present invention.
Figure 4:
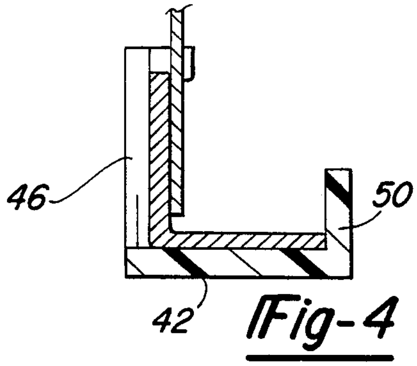
FIG. 4 is a cross-sectional view taken along line 4—4 in FIG. 1 and en for clarity.
Figure 5:
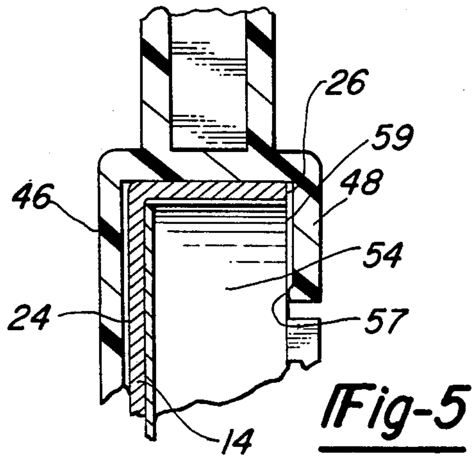
FIG. 5 is a cross-sectional view taken substantially along line 5—5 in FIG. 2 and enlarged for clarity.

With reference now particularly to FIGS. 3, 5 and 7, the walls 42, 44, 46 and 48 of the bracket section 32 form an elongated and generally rectangular channel 54 which is dimensioned to slidably receive the side rail 14 therein. As best shown in FIG. 7, the bracket section 48 is first positioned over the rail 14' so that the top rail 16 is positioned above the part 50 of the housing back wall 48.

The bracket 30 is then pivoted so that the rail 14' is positioned within the channel 54 as shown at 14". The bracket 30 is then pushed down on the rail 14 as shown by arrow 55 until a top wall 56 of the bracket section 32 abuts against the top rail 16. Upon doing so, the rail 14 is contained within the rectangular channel 54.

With the rail 14 positioned within the channel 54 in the previously described fashion, the front wall 46 of the bracket section 32 overlaps a portion of the front surface 24 of the rail 14 (FIG. 5). Simultaneously, the rear wall 48 overlaps the rear surface 26 of the rail 14.

Figure 6:
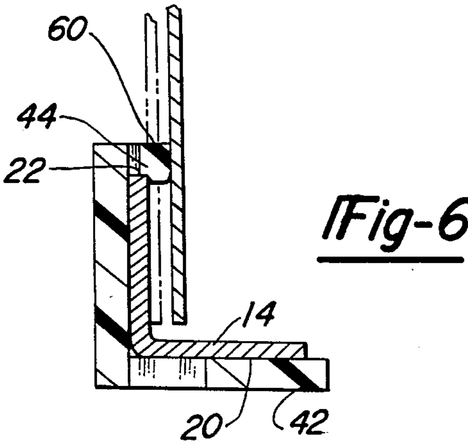
FIG. 6 is a sectional view taken substantially along line 6—6 in FIG. 2 and enlarged for clarity.

Simultaneously, as best shown in FIG. 6, the outside wall 42 overlaps and abuts against the outside surface 20 of the rail 14 while the inside wall 44 overlaps and abuts against the inside surface 22 of the rail 14. In doing so, the inside and outside surfaces 20 and 22 are contained and sandwiched in between the inside and outside walls 44 and 42, respectively.

With reference now to FIGS. 3 and 6, the entire bracket 30 is preferably of a one piece construction and constructed of a flexible material, such as plastic. A flexible tab 60 is formed on the inside wall 44 and resiliently engages the inside wall 22 of the rail 14. In doing so, the rail 14 is resiliently clamped in between the flexible tab 60 on the inside wall 44 and the outside wall 42 thereby firmly, but detachably, secures the bracket 30 to the sign rail 14. Similarly, the upper part 50 of the back wall 48 clampingly engages the back surface 26 of the side rail 14 as best shown at 57 in FIG. 5. In order to further enhance the clamping engagement of the side rail 14 between the front wall 46 and the back wall 48, preferably a bending slot 59 is provided in the bracket 30 adjacent the back wall part 50 to facilitate bending of the back wall part 50.

In operation, the brackets 28 and 30 can be readily manually attached to and detached from the sign rails 14 and, when attached, the brackets clampingly engage the rails 14. Once attached, the slots 36 slidably receive a placard 40 therebetween thus securing the placard 40 to the sign 12 in the desired fashion. Furthermore, the means for attaching the brackets 38 and 30 are integrally formed with the brackets themselves and no tools are required to attach the brackets 28 and 30 to the sign 12.

Having described my invention, many modifications thereto will become apparent to those skilled in the art to which it pertains without deviation from the spirit of the invention as defined by the scope of the appended claims.

I claim:

1. An attachment for a sign of the type having two spaced apart side rails, said attachment comprising:

a pair of elongated brackets, each having first and second longitudinally adjacent sections;

means integrally formed with said brackets for detachably securing the first section of said brackets to the rails on the top and on opposite sides of the sign so that the second sections of said brackets extend upwardly from the sign and are spaced apart and parallel to each other, wherein said second sections of said brackets having facing slots adapted to receive and support a placard, wherein each rail has a cross-sectional shape with a side leg and a back leg, said legs intersecting each other at substantially a right angle and wherein said detachable securing means comprises means for engaging said legs of said rails, wherein said first sections of said brackets each include a channel dimensioned to slidably receive one of said rails, wherein each rail has an outside surface, an inside surface, a front surface and a back surface, said inside and outside surfaces being spaced apart and parallel, said front and back surfaces being spaced apart and parallel and generally perpendicular to said inside and outside surfaces, and wherein said detachable securing means of each bracket further comprises an inside wall, an outside wall, a front wall and a back wall which respectively overlaps said inside, outside, front and back surfaces of the rail, and wherein said back wall comprises two spaced parts and wherein said inside walls are longitudinally positioned in between said spaced parts of said back wall.

2. The invention as defined in claim 1 wherein said inside wall and said back wall extend only along a portion of said first section of each said bracket.

3. The invention as defined in claim 2 wherein said inside wall and said back wall are longitudinally spaced from each other.

4. The invention as defined in claim 1 wherein said inside wall comprises means for resiliently engaging the inside surface of said rail.

5. The invention as defined in claim 4 wherein said bracket is made of a resilient material and wherein said resilient engaging means comprises a tab integrally formed with said bracket.

6. The invention as defined in claim 1 wherein said brackets are mirror images of each other.

* * * * *